United States Patent [19]

Duncan et al.

[11] Patent Number: 4,983,259

[45] Date of Patent: Jan. 8, 1991

[54] OVERLAND PETROLEUM PROCESSOR

[76] Inventors: James W. Duncan, 800 S. Gessner, Ste. 840; Lawner L. Knox, 820 Gessner #1010, both of Houston, Tex. 77024

[21] Appl. No.: 140,401

[22] Filed: Jan. 4, 1988

[51] Int. Cl.⁵ .......................... B01D 3/14; C10G 7/00
[52] U.S. Cl. ...................................... 196/106; 196/132; 196/155; 202/83; 202/154
[58] Field of Search ............... 196/105, 106, 132, 134, 196/139, 99, 100, 155; 202/83, 154; 203/DIG. 24; 364/501

[56] References Cited

U.S. PATENT DOCUMENTS

| 97,058 | 11/1869 | DeLime | 202/83 |
| 412,407 | 10/1889 | Napoles | 202/83 |
| 1,764,190 | 6/1930 | Bell | 196/134 |
| 1,871,148 | 8/1932 | Brewster | 196/106 |
| 2,901,406 | 8/1959 | Kirshenbaum et al. | 202/154 |
| 3,294,648 | 12/1966 | Lupfer et al. | 196/132 |

FOREIGN PATENT DOCUMENTS 805287  11/1936  France .................................. 202/83

*Primary Examiner*—Joye L. Woodard
*Attorney, Agent, or Firm*—Matthews & Assoc.

[57] ABSTRACT

A mobile petroleum processor or refinery. In particular a petroleum processor or refinery which has been constructed on railroad flatbed cars. The different units that make up the refinery are mounted on individual flat bed railroad cars and connected together. These cars can be moved over railroad networks to provide a petroleum refinery which can be moved in, set up, operated and taken down in a short time.

4 Claims, 2 Drawing Sheets

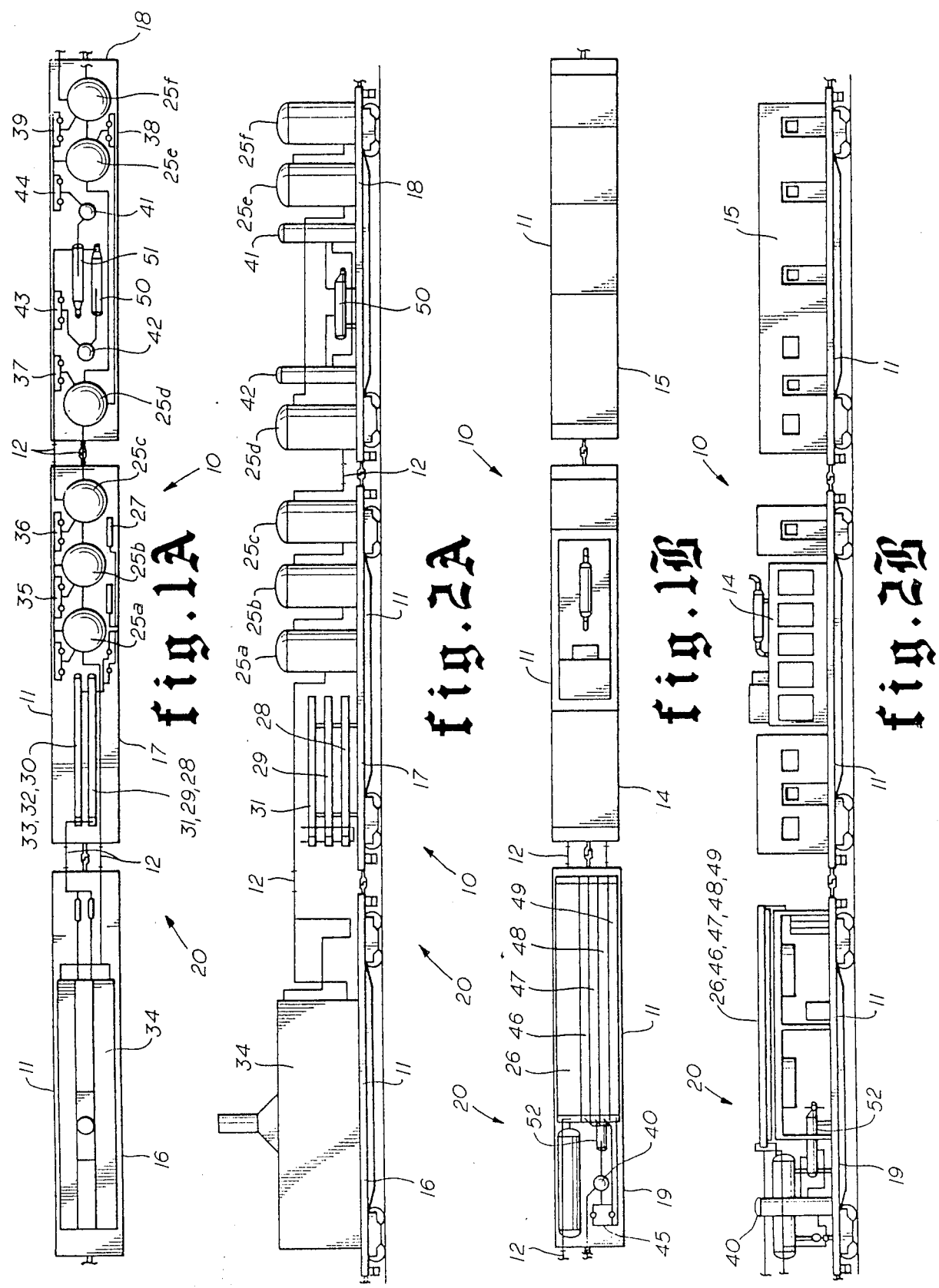

4,983,259

OVERLAND PETROLEUM PROCESSOR

FIELD OF THE INVENTION

This invention relates to a mobile overland petroleum processor. More particularly, the present invention relates to a petroleum processor, or refinery, which has been constructed on a plurality of flatbed railroad cars, and which is adapted to be moved over a railroad network to a selected site.

BACKGROUND OF THE INVENTION

Since its inception, the petroleum industry has transported crude to centrally located, high technology refineries at an ever-increasing transportation cost to crude producers. These protracted transportation procedures also result in long turnaround times in transforming the crude to final product.

During a national emergency, refinery facilities are prime targets for destruction. A readily mobile refinery would be a target difficult to find during evasive maneuvers.

One attempt to transport the fractionation unit to the site is disclosed in French Patent No. 805,287 issued to Gazagene, et al. This patent discloses a batch type wine distillation process or still mounted on a railroad car. U.S. Pat. No. 1,764,190 issued to Bell, U.S. Pat. No. 2,901,406 issued to Kirshenbaum, et al. and U.S Pat. No. 1,871,148 issued to Vrewster, disclose the cycling of vapor from a preceding column to the next to effect the distillation. None of the cited references disclose the mounting of a plurality of fractionation vessels on a railroad car for connection together.

OBJECTS OF THE INVENTION

It is therefore an object of the present invention to merge the railroad network and the petroleum industry into one mutually beneficial operation.

It is another object of the present invention to shorten the turnaround time in transforming crude to final products.

It is still a further object of the present invention to reduce the expense associated with remote wells due to transportation charges.

It is still a further object of the present invention to provide a novel petroleum processor which can be moved in, set up, operated, and taken down in a short time.

It is yet another object of the present invention to provide a mobile refinery facility which may be "hidden" or readily moved as necessary for evasive action.

These and other objects of the present invention will be best understood upon a reading of the following detailed description taken in connection with the accompanying drawings with the understanding, however, that the invention is not confined to a strict conformity with the drawings but may be changed or modified so long as such changes or modifications constitute no material departure from the salient features of the invention.

It is to be understood that while a particular embodiment of the present invention is herein illustrated and described, it is not intended to limit the invention to such disclosure, which is made for purposes of description and not of limitation, since the scope of the present invention is defined by the appended claims.

BRIEF DESCRIPTION OF THE DRAWINGS

FIG. 1 is a plan view of the equipment arrangement of the overland petroleum processor of the present invention.

FIG. 2 is a side elevational view of the equipment arrangement of the overland petroleum processor of the present invention.

DESCRIPTION OF THE PREFERRED EMBODIMENTS

Figure 3:
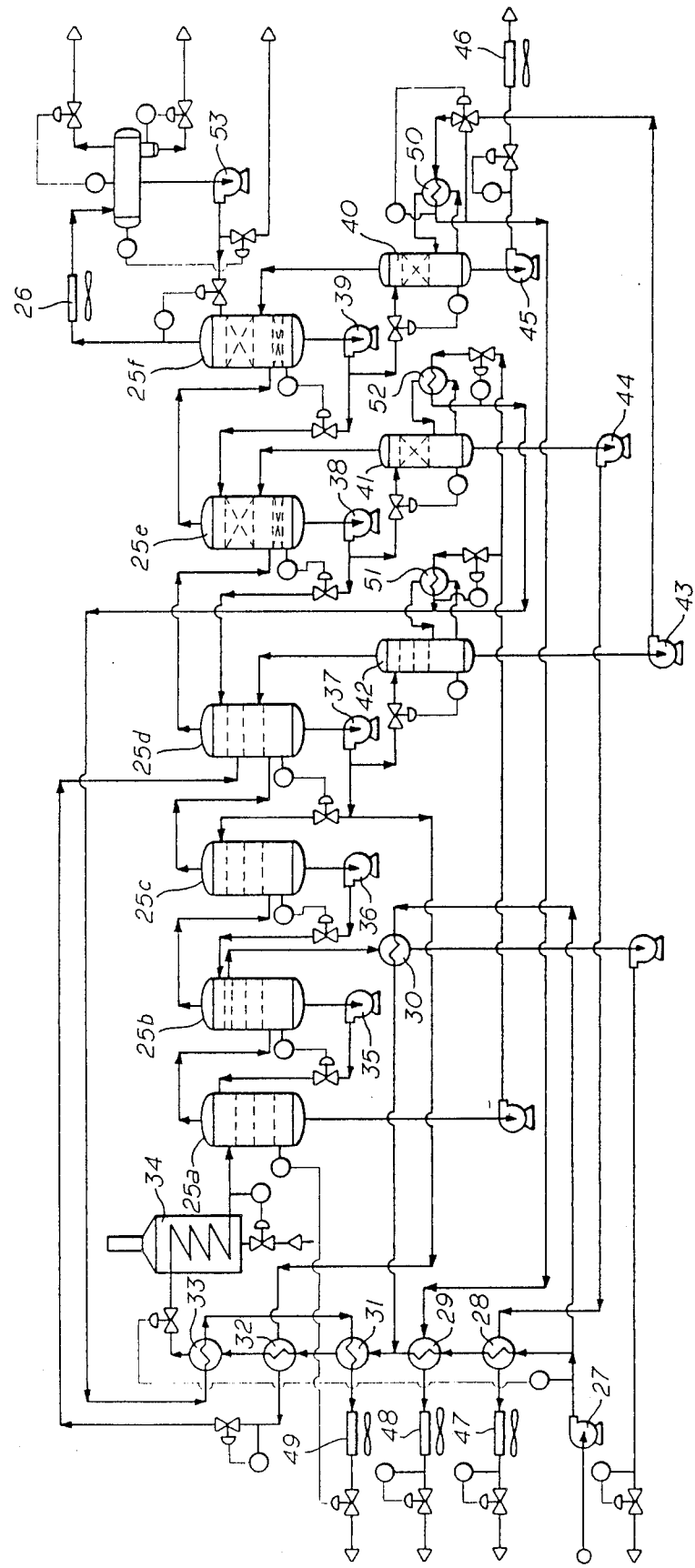
FIG. 3 is a process flow diagram of the overland petroleum processor of the present invention.

In brief, the process herein utilizes a mOdular approach to crude fractionation. It is versatile enough to be energy efficient and product efficient. The crude is analyzed before initial set-up and the process is structured with a computer to exact the most out of the particular crude. If tighter fractions are needed to obtain more diesel, for example, computer commands are entered and the appropriate valves and pumps are actuated. The computer controls start-up and shut-down as appropriate to accelerate production.

Referring now to the drawings, the overland petroleum processor of the present invention is illustrated perspectively in FIGS. 1 and 2, showing therein top plan and side elevational view respectively. FIG. 3 is a schematically illustrative process flow diagram of the process disclosed.

The mobile overland petroleum processor 10 is adapted to be disposed on a plurality of rail cars 11. Each rail car is a separate module having interconnections 12 consisting of pipe and electrical conduit arranged with swivel points and flexible connections so as to expedite connection or disconnection upon start-up or shut-down of processing operations.

It is to be understood that the interconnections between cars or modules are disconnected during transportation, and the interconnections are arranged compatibly so that modules or cars may be added or deleted. In other words, the interconnections of one module are interchangeable with those of another as appropriate.

In the use and operation of the invention, at least one utility generating car 14, a control room car 15, and a plurality of cars 16–19, upon which is disposed the modular crude fractionation unit 20, are coupled in a train behind a locomotive. The numbers and types of cars may be varied depending upon the size and kind of operation undertaken, the effective height of the crude tower, or the number of products desired. Thus, the invention could include tank cars for each product refined, desalter exchange car, equipment and maintenance car, quarters car, kitchen and dining car, for example.

The utility generating car 14 is adapted to supply electrical power to each car through electrical cables which are releasably coupled together between each of the cars. One end of the utility generating car 14 details a battery room. The central portion of the utility generating car encloses a turbine generator set, while the other end of the car houses the motor control center and switch gear.

The control room car 15 is arranged with a central room having a CRT console at one end, office facilities in the middle, and lab with sufficient storage space at the other end. The computer controls the start-up and shut-down steps so as to facilitate production. The entire process is structured from the console to exact the most from the particular crude. It will be readily appreciated that the present processor may be operated and the process undertaken and accomplished with minimum operating personnel.

The modular crude fractionation unit 20 comprises a plurality of modules. These modules are respectively disposed on a separate rail car 16–19 and operatively interconnected. Crude is fractionized in the crude tower which consists of six (6) separate vessels 25a–25f so as to meet height restrictions for transportation. Each vessel is designed for intermediate product draw between vessels. The effective height of the crude tower may be increased by adding additional modules or vessels. If fewer products are to be refined, a module or number of modules (vessels) may be deleted.

The crude oil analysis required is simply a true boiling point (TBP) plot which is plot of the percent by volume vaporized versus the true boiling temperature of the crude oil. If possible, the API gravity should also be plotted against the true boiling temperature also. A simple way to obtain a true boiling point plot is to use a liquid-gas chromatograph as may be obtained from an analytical instrument company such as Beckman Instruments or Hewlett-Packard. Such instruments can easily and quickly calculate either the weight percent vaporized or volume percent vaporized at a given temperature. A standard ASTM D-86 distillation can be converted to a TBP curve using the method shown and the *API Data Book* which is published by the American Petroleum Institute. The TBP curve generated in such a manner gives a volume percent vaporized versus true boiling point. The two curves can then be used to obtain the API gravity (or specific gravity) at any given boiling point.

Since crude oil contains a multitude of individual components which cannot be easily identified, "pseudo" components must be generated using the TBP and API gravity plots. Characteristics and properties of the "pseudo" components may be obtained by using the methods outlines in the *API Data Book*. All of this information is now available on computer programs or can be easily converted to computer programs using the equations given in the *API Data Book*. Similarly, multicomponent fractionation can be simulated on a computer using the properties of the "pseudo" components. The "pseudo" component property generation program may be conveniently combined with a fractionation simulation program such that a minimum of data is required to determine the optimum number of fractionation vessels as required for a given crude oil in the desired product.

The computer may be conveniently connected to a control system of valving and piping as illustrated in the flow diagram to automatically connect the fractionation vessels necessary to provide the desired products. Otherwise, the valving and piping may be manually arranged according to the flow rates required as calculated by the computer.

Using conventional control valves and instrumentation, the flow rates to and from the levels in the individual vessels may be controlled as calculated by the computer to obtain the desired separation. Preferably, the whole unit is controlled by the computer using conventional set-point computer control, the set-points being determined by the simulation.

Upon tapping into the crude producing well, or crude storage facility, the crude oil is pumped with a crude charge pump 27 at a pressure sufficient to insure that the crude oil remains in the liquid phase. The crude oil is then partially preheated with a kerosene/crude heat exchanger 28, a diesel/crude heat exchanger 29 and a gas oil/crude heat exchanger 30 (middle distillate products).

Preheating is completed by a reduced crude/crude heat exchanger 31, a pump around/crude heat exchanger 32, and a reduced crude/crude heat exchanger 33. The preheated crude is finally heated in the crude charge heater 34 to a temperature adequate to vaporize sufficient crude to obtain the desired product. The vaporized crude is fractionized into liquid and gas products in a specially designed crude tower 25 consisting of six (6) separate vessels 25a–25f, for example. Overhead gas is partially condensed by an overhead condenser 26. A portion of the condensed light naphtha is pumped by reflux pump 53 to the tower as reflux, and the balance is pumped to storage.

The bottom liquid from each crude tower vessel 25a–25f may be conveniently pumped as reflux to the preceding vessel or withdrawn as product by using the booster pumps 35–39. The products are then stripped in product strippers 40–42 to adjust product properties and then pumped by diesel pump 43, kerosene pump 44 and heavy naphtha pump 45 through a heavy naphtha cooler 46, a kerosene cooler 47 and a diesel cooler 48.

The hot diesel product provides heat for the heavy naphtha reboiler 50, and hot reduced crude provides heat for the diesel reboiler 51 and the kerosene reboiler 52.

The flexibility of the disclosed system becomes readily apparent when the wide range of individual crude oils to be processed is considered. The number of smaller fractionation vessels, some duplicative, allows the user to "design" a fractionation module that can accommodate the design parameters of distillation—i.e. vapor flow rate, vapor velocity liquid flow and reflux rates—without having a "bottle neck" due to a single component in a particular crude oil being out of proportion to the other components. For example, a crude oil having a greater volume of naphtha can be accommodated by using two vessels in parallel for the naphtha separation.

The overland petroleum process is a highly mobile crude oil processing system capable of processing a wide range of light-to-heavy crude oil. It is designed to produce a broad slate of products: light and heavy naphtha, kerosene, diesel, and fuel oil products.

The crude distillation process and equipment herein described is the same for processing sour (containing sulfur) and sweet crudes, except for equipment metallurgy and minor operating alterations.

The equipment in a unit designed for sweet crude processing is essentially of carbon steel construction with low chrome/nickel alloy associated with the inlet and lower section of the crude tower. A unit designed for sour crude processing would be equally suited for processing sweet and sour crude oils. The products of the crude unit are treated to meet sales specifications. The naphtha products are typically treated with caustic to remove mercaptans (organic sulfide compounds) and dissolved $H_2S$. Sulfurous compounds in diesel and kerosene are reacted with hydrogen in the presence of a catalyst (hydrotreating) to form $H_2S$ which is easily stripped from the treated product. The fuel oil products are also hydrotreated but at much higher pressure and temperature and with different catalysts application.

The treating of products can be performed on-site with the crude fractionation or at a remote location.

Crude that contains brine, sediment and water (BSW) may be sweet or sour. A modular desalting unit can be added as a separate unit. This unit can be sorted out when not required, and rapidly replaced in service in the event that BSW appears in the crude.

The respective crude oil is heated to a temperature (100°-300° F.) that best suits its physical properties. Water is injected to dissolve the BSW. Separation of the immiscible phases is greatly enhanced electrically since the water phase containing salt is electrolytic.

The brine (water phase) is drawn and disposed of by several methods, such as injection into a disposal well.

In conclusion, the invention provides mobile overland petroleum processor disposed on plurality of railroad cars. The processor includes a crude heater capable of burning various petroleum products. The heater provides the primary heat for fractionation separation. A modular, crude fractionation unit is operatively connectible to the heater the fractionation unit having a plurality of modules mounted on respective railroad cars. Each of the modules comprises at least one fractionation vessel provided with fractionation trays specifically designed to meet railroad height, width and weight requirements, each of the modules is operatively connectible one to the other to vary the total effective number of fraction trays in order to effect the desired separation of a selected crude oil.

A plurality of heat exchangers and coolers are operatively connectible to the fractionation vessels to provide product cooling and recover heat from the product. A control system of valving and piping operatively connects the fractionation vessels in series or parallel. A computer operates the control system which is capable of performing simulation of a multi-component fractionation to determine the required number of said trays to effect the desired separation. A utility module is mounted on a separate railroad car and operatively connectible to the heater, the crude fractionation unit, and the computer and said analytical laboratory to provide the necessary electrical power for the operation of said processor. The computer is operatively connectible to said control system whereby the computer operatively connects the required number of fractionation vessels by opening or closing the necessary valves contained within the control system.

The modular fractionation unit includes a crude reduction fractionation vessel operatively connectible to receive hot crude oil from the heater and wherein substantially all of the components of the hot crude oil that will not vaporize at the temperature of the hot crude oil is removed as reduced crude with the vaporized constituent portion being taken overhead for further processing. A gas oil fractionation vessel is operatively connectible to receive the vapor constituent and to remove gas oil liquid product in the desired boiling range and specific gravity. An intermediate fractionation vessel is operatively connectible to receive the overhead vapors from the gas oil fractionation vessel to provide a reflux for the gas oil fractionation vessel to ensure separation of the overhead vapors and the liquid constituents.

A diesel fractionation vessel is operatively connectible to the intermediate fractionation vessel to receive the vapors from the intermediate fractionation vessels and to separate out diesel product. A kerosene fractionation vessel is operatively connectible to receive the overhead vapors from the diesel fractionation vessel to separate out kerosene product. A naphtha fractionation vessel is operatively connectible to receive the vapors from the kerosene fractionation vessel to separate out naphtha and heavy naphtha components. An overhead condenser and receiver arrangements is operatively connectible to receive the overhead vapors from the naphtha fractionation vessel to separate the light naphtha from the gaseous constituents.

A diesel stripper vessel is operatively connectible to receive liquid product from the diesel fractionation vessel and to remove substantially all the light ends and control the vapor pressure of said diesel liquid product. A kerosene stripper vessel is operatively connectible to receive liquid product from the kerosene fractionation vessel and any light end and control the vapor pressure of the kerosene liquid product. A naphtha stripper vessel is operatively connectible to receive liquid product from said naphtha fractionation vessel and any light ends and control the vapor pressure of the naphtha liquid product. Heat exchangers are provided for cooling bottom liquid product from the reduced crude fractionation vessel, the diesel stripper, and the kerosene stripper.

Heat is provided for the kerosene and diesel strippers by exchange with the hot liquid product from the reduced crude fractionation vessel and heat is provided for said naphtha stripper by exchange with liquid product from said diesel stripper. The liquid bottoms from the diesel fractionation vessel are cooled in a heat exchanger and return to the diesel fractionation vessel as a reflux. The crude reduction fractionation vessel, the intermediate fractionation vessel and the gas/oil fractionation vessel are mounted on a single railway car and the diesel fractionation vessel, the kerosene fractionation vessel and the naphtha fractionation vessel are mounted on a single railway car.

Though only one embodiment has been illustrated and described herein, it is to be understood that substantial changes may be made within the spirit of the invention and the purview and scope of the approved claims.

What is claimed is:

1. A petroleum processor in combination with a plurality of railroad cars, said processor comprising:
  (a) a crude heater capable of burning various petroleum products, said heater providing the primary heat for fractionation separation;
  (b) a modular, crude fractionation unit with means for connecting said modular fractionation unit to said heater, said fractionation unit including a plurality of fractionation vessels mounted on said railroad cars, wherein said vessels are specifically designed to meet railroad height, width and weight requirements, a control system of valving and piping with means for connecting each of said vessels disposed on a respective railroad car one to the other in series and for serially connecting the downstream vessel and the upstream vessel disposed on adjacents ones of said railroad cars so as to enable variance of the total effective number of fractionation vessels in order to effect the desired separation of a selected crude oil.
  (c) said unit further comprising a plurality of heat exchangers and coolers and means for connecting said heat exchangers and coolers to said fractionation vessels to provide cooling for and heat recovery from the separated products of fractionation;
  (d) computer means for operating said control system and performing simulation of a multi-component fractionation to determine the required number of said vessels to effect the desired separation; and, (e) a utility module mounted on a separate one of said railroad cars and means for connecting said utility module to said heater, said crude fractionation unit, and said computer means to provide the necessary electrical power for operation thereof.

2. The petroleum processor of claim 1 wherein at least one of said fractionation vessels include liquid bottom recycle means connected to the respective upstream fractionation vessel for providing a reflux thereto.

3. The processor of claim 1 wherein said modular fractionation unit comprises:

(a) a crude reduction fractionation vessel for receiving hot crude oil from said heater for separation into a reduced crude constituent and a first vapor constituent;

(b) a gas oil fractionation vessel for receiving said first vapor constituent and separating the first vapor constituent into a gas oil liquid product in the desired boiling range and specific gravity and a second vapor constituent;

(c) an intermediate fractionation vessel for receiving said second vapor constituent and treating said second vapor constituent to separate a reflux for said gas oil fractionation vessel;

(d) a diesel fractionation vessel for receiving said treated second vapor constituent from said intermediate fractionation vessel and separating the treated second vapor constituent into a diesel product constituent and a third vapor constituent;

(e) a kerosene fractionation vessel for receiving said third vapor constituent and separating said third vapor constituent into a kerosene product constituent and a fourth vapor constituent;

(f) a naphtha fractionation vessel for receiving said fourth vapor constituent and separating said fourth vapor constituent into a heavy naphtha products and a fifth vapor constituent;

(g) overheat condenser and receiver means for receiving said fifth vapor constituent and separating a light naphtha product from the fifth vapor constituent;

(h) a diesel stripper vessel for receiving said diesel product constituent from said diesel fractionation vessel and removing substantially all the light ends therefrom and controlling the vapor pressure of said diesel product constituent;

(i) a kerosene stripper vessel for receiving said kerosene product from said kerosene fractionation vessel and removing light ends therefrom and controlling the vapor pressure of said kerosene product; and, (j) a naphtha stripper vessel for receiving said heavy naphtha product from said naphtha fractionation vessel and removing light ends therefrom and controlling the vapor pressure of said heavy naphtha product.

4. The petroleum processor of claim 3 wherein said crude reduction fractionation vessel, said intermediate fractionation vessel and said gas oil fractionation vessel are mounted on a single railroad car of said plurality of railroad cars and said diesel fractionation vessel, said kerosene fractionation vessel and said naphtha fractionation vessel are mounted on a single railroad car of said plurality of railroad cars.

* * * * *